United States Patent [19]
White

[11] 3,829,780
[45] Aug. 13, 1974

[54] DATA MODEM WITH ADAPTIVE FEEDBACK EQUALIZATION FOR CANCELLATION OF LEAD-IN AND TRAILING TRANSIENTS

[75] Inventor: Stanley A. White, Yorba Linda, Calif.

[73] Assignee: Rockwell International Corporation, El Segundo, Calif.

[22] Filed: Nov. 14, 1972

[21] Appl. No.: 306,389

[52] U.S. Cl. .................................... 325/42, 333/18
[51] Int. Cl. ............................................. H03h 7/36
[58] Field of Search ........ 325/42, 65; 333/17 R, 18; 328/165, 168, 155; 179/69 R

[56] References Cited

UNITED STATES PATENTS

| | | | |
|---|---|---|---|
| 3,614,622 | 10/1971 | Holsinger | 325/42 |
| 3,699,321 | 10/1972 | Gibson | 333/18 X |
| 3,736,511 | 5/1973 | Gibson | 325/42 X |

*Primary Examiner*—Benedict V. Safourek
*Attorney, Agent, or Firm*—L. Lee Humphries; H. Frederick Hamann

[57] ABSTRACT

An adaptively equalized data modem affords cancellation of both lead-in and trailing transients, affording optimum correction of distortion in, and resulting intersymbol interference of, digital data received over a transmission channel. Adaptive feedback equalization is employed, as known heretofor, for adaptively learning the impulse response of the transmission channel, through cross-correlation of previously received data bits with the signal currently received. A correction signal is derived by multiplying the learned impulse response values by the stored data bits and summing the products. The correction signal is utilized in a feedback path to cancel trailing transients. Preliminary data decisions are produced in an input delay line system for multiplying with corresponding ones of the learned impulse response values, to produce cancellation terms corresponding generally to lead-in transients. A succession of preliminary data decisions of any desired number may be produced for developing a desired number of lead-in terms, and thereby to afford a desired degree of accuracy in the cancellation of the lead-in transients. Whereas the preliminary data decisions are discarded, the lead-in transient cancellation terms developed in accordance therewith, and the trailing transient cancellation terms developed through adaptive feedback equalization, provide for cancellation of both lead-in and trailing transients and a high degree of accuracy in recovery of the transmitted digital data.

15 Claims, 9 Drawing Figures

DATA MODEM WITH ADAPTIVE FEEDBACK EQUALIZATION FOR CANCELLATION OF LEAD-IN AND TRAILING TRANSIENTS

BACKGROUND OF THE INVENTION

1. Field of Invention

This invention relates to a system for correcting distortion of digital data sent over a transmission channel. More particularly, the invention relates to a digital, impulse response correction system affording cancellation of both lead-in and trailing transients by adaptively determining and responding to the impulse response of the transmission channel thereby permitting recovery of the transmitted data in essentially undistorted form.

2. Description of the Prior Art

As is well known, typical telephone transmission channels or lines exhibit considerable delay distortion which, while tolerable for voice transmission, create severe distortions of digital signals transmitted on the line. Impulse response correction systems have been developed heretofore in the prior art to compensate for, or correct, the distortions in the received data signals. The types of distortion which may exist are a function of the transmission channel and as well, of the type of data modulated signal transmitted on the line. In general, however, signal components of the transmitted digital data, at different frequencies in the audio passband, experience variously longer or shorter transmission time delays than do components at other frequencies. There result in the received signal both a form of distortion known as lead-in transients and also a form of distortion known as trailing transients.

In high-speed data transmission, these leading and trailing transients extend into the time intervals of transmission of preceding and succeeding digital pulse signals, presenting severe distortion of each such pulse signal upon receipt of a receiver. Since the distortion of a given pulse is a result of the lead-in and trailing transients associated with preceding and succeeding pulses, the distortion is frequently characterized as interpulse interference.

Many systems have been proposed in the prior art to correct for this distortion, systems of particular interest to the present invention being disclosed in U.S. Pat. No. 3,524,167-McAuliffe et al, issued Aug. 11, 1970 and U.S. Pat. No. 3,614,623 -McAuliffe issued Oct. 19, 1971, both assigned to North American Rockwell Corporation, the assignee of the present invention. Reference may be had to these patents for a more detailed discussion of prior art techniques in correcting for distortion occurring in digital transmission and, as well, for a detailed disclosure of systems providing for cancellation of trailing transients, and with which systems the present invention may be employed to afford cancellation as well of the lead-in transients.

SUMMARY OF THE INVENTION

The present invention provides both a method of and system for cancellation of lead-in transients associated with digital data transmission, to correct for the distortion of the data signals resulting from such transients. The present invention employs adaptive feedback equalization to provide cancellation of trailing transients, and additionally provides for cancellation of lead-in transients, thereby to optimize the accuracy with which the received data signals are recovered. The system of the invention, including both the leading and trailing transient cancellation portions thereof, may utilize digital components exclusively and thus lend itself to microminiature implementation.

Reference may be had to the above-noted patents for a detailed description of adaptive equalization and cancellation of trailing transients through decision feedback. Accordingly, the description of the present invention is directed primarily to the provisions for additionally effecting cancellation of trailing transients.

In general, and in accordance with conventional techniques, the analog signal received from the telephone channel is amplified as in an A.G.C. amplifier and demodulated in a phase locked loop to produce the basebanded signal. The signal, either prior to demodulation or subsequently, is then converted to a digital signal such as by a conventional analog-to-digital converter circuit. In either case, the digital signal, distorted as a result of the above-described characteristics of the transmission line, is supplied to an equalizer constructed in accordance with the invention. In the following discussion, it is to be understood that the digital signals may comprise multi-bit digital words characterizing the amplitude value of the sampled, received signal. However, the system of the invention is not limited to use with digital systems.

The system of the invention includes both an adaptively equalized input portion which generally provides for cancellation of lead-in transients, and an adaptively equalized feedback portion which provides for cancellation of the trailing transients. Jointly these portions learn the impulse response of the transmission channel, and generate an error correction signal to be subtracted from the sampled data signal to cancel both lead-in and trailing transients therein.

In a digital implementation of the system, each of the input and feedback portions include a shift register, the input register storing the successive data samples and the feedback register storing the digit decisions. More specifically, the sampled signals are supplied at the sampling rate (and thus the baud rate of transmission) to the first stage of the input shift register. Associated with the shift register stages are summing circuits and quantizers. In the first stage, the sampled signal is summed with a feedback signal derived from the feedback portion for cancelling the trailing transient terms. The resulting signal is quantized for deriving an estimate of a digit associated with that stage. The value thus estimated is only a rough approximation and thus the digit is not used itself as data. The digit, however, is used in a successive stage of the input shift register, and particularly is multiplied with a corresponding impulse response term derived from the feedback portion of the system for developing a first lead-in transient cancellation term. The sampled signal at the next successive stage of the input register then is summed with the trailing transient cancellation terms and the first lead-in transient cancellation term, derived as aforesaid, to provide a more accurate signal, from which trailing transient terms and the first lead-in transient term have been cancelled. A data decision based on this more accurate signal then is made. Successive stages of the input portion thus utilize the preliminary digit decisions generated therein for developing successively more accurate digital decisions. As many stages of the input register are provided as are desired in accordance with the level of accuracy to be attained in the cancellation of the lead-in transient terms. Correspondingly, the feedback register of the adaptive feedback portion of the system has as many stages as are desired for developing trailing transient cancellation terms. The resulting signal on which final data decisions are made thus has cancelled therefrom both lead-in and trailing transient terms, enabling recovery of the transmitted data with high accuracy. Whereas prior art systems utilizing adaptive feedback equalization only have attained error rates as low as $10^{-4}$, use of the present invention with such systems enables realization of error rates as low as $10^{-5}$ to $10^{-6}$.

DETAILED DESCRIPTION OF THE INVENTION

As discussed hereinabove, cancellation of trailing transients through use of adaptive feedback equalization is a technique taught in the prior art and particularly in U.S. Pat. Nos. 3,562,469 and 3,614,623, assigned to the common assignee hereof. The present invention affords additional correction through the further provision of cancelling lead-in transients, affording a significant improvement in the accuracy of recovery of the received data. To explain the techniques involved, the initial portion of the following detailed description analyzes the lead-in transient cancellation function and particularly the technique of deriving preliminary data decisions; these are used for computation of the channel responses, but not as data and in that context can be considered as discarded. The initial preliminary decision affords only rough equalization and successive preliminary decisions afford successively more complete, and thus more accurate equalization for achieving correction for the lead-in transients. As many stages of adaptive equalization of lead-in transient correction as desired may be provided.

The digit decisions from which the output data is derived are as well used in the portion of the system affording adaptive feedback equalization for cancellation of the trailing transients. It is this latter function which corresponds, or is similar, to that taught in the noted prior art patents. The specific implementation of the present invention disclosed herein is more closely analogous to that of the latter U.S. Pat. No. 3,614,623. Very generally stated, the improvement of the latter patent over the earlier relates at least in part to achieving cross correlation by determination of residual distortion. Reference is had to the two noted patents for a detailed teaching of the systems therein disclosed and the said patents are incorporated herein for their respective teachings.

Figure 1A:
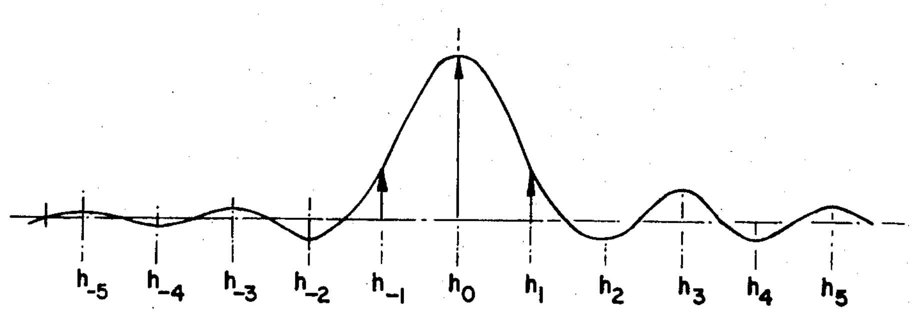
FIG. 1A is a wave form illustrating a typical impulse response of a transmission channel, and particularly showing both lead-in and trailing transients.

In FIG. 1A is illustrated a signal pulse response characteristic, alternatively characterized as the basebanded impulse response, of some arbitrary transmission channel. The indicated amplitude values of $h_0$ and $h_1$ . . . are spaced at the sampling intervals, and, correspondingly, at the baud rate of transmission of the original data. These samples relate to the trailing transient and are considered at length in the noted patents. FIG. 1A as well illustrates the lead-in transient and the corresponding response characteristics of $h_{118\ 1}$ and $h_{-2}$ . . . again spaced at the baud intervals.

Figure 1B:
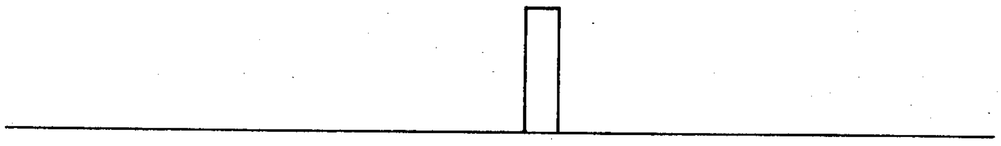
FIG. 1B is a wave form representing an idealized, received pulse response.

In FIG. 1B there is illustrated a signal pulse representing the idealized pulse response of the system to the received signal having the wave form of FIG. 1A. This idealized pulse response would correspond to the original data pulse transmitted in the absence of distortion imposed by the transmission channel. As discussed in the prior patents, at the high data rates of transmission required for practical and efficient systems, successive pulses must be spaced closely in time. The result is that the received signals, each having a wave form as in FIG. 1A, overlap in time, producing severe distortion of the amplitude values at the sampling times. This result is shown, for example, in FIG. 4D of each of the foregoing patents.

It is the purpose of the present invention, therefore, to improve upon the trailing transient correction function of the systems of the prior patents, by extending the principles of adaptive feedback equalization to enable cancellation of the lead-in transients as well. It is to be appreciated that error rates of exceedingly low values, such as $10^{-4}$, are achieved through the use of adaptive feedback equalization in accordance with the prior patents, for cancellation of trailing transients; the present invention improves upon that error rate, lowering it to a value of $10^{-5}$ or $10^{-6}$.

Figure 2:
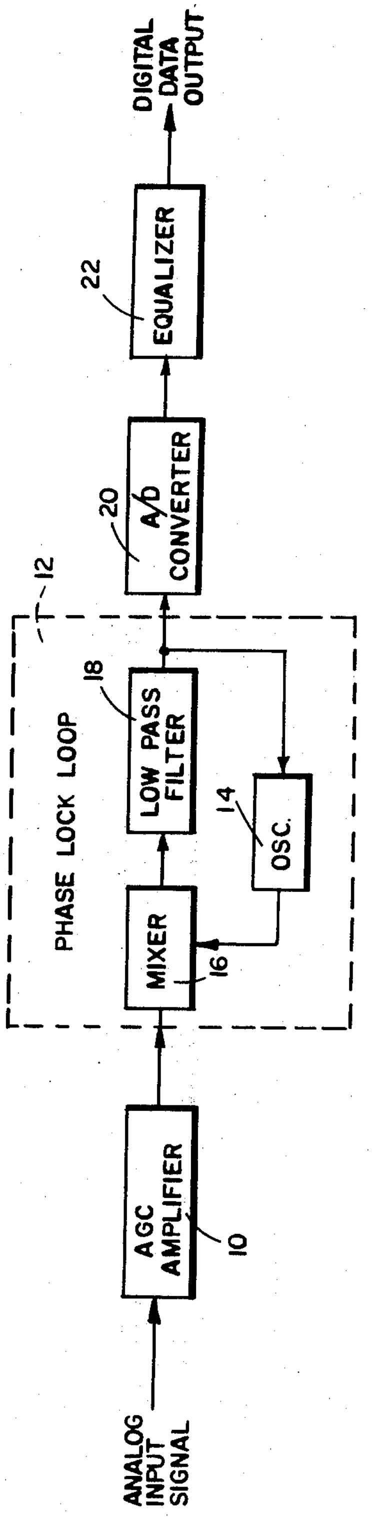
FIG. 2 is a generalized block diagram of a receiver with which the system of the present invention may be employed.

In FIG. 2 is shown a basic block diagram of a receiver in which the present invention would be utilized. The analog signal from the telephone channel is supplied to an A.G.C. amplifier. The amplified signal is supplied to a phase lock loop 12 which, conventionally, may include a local oscillator 14 locked in frequency and phase with the carrier frequency and phase of the received signal, and the output of which is supplied to a mixer 16 receiving the input signal. The demodulated output from mixer 16 is supplied through a low pass filter 18 to produce the basebanded signal at the output of loop 12. The basebanded signal then is supplied to analog to digital converter 20, which serves to derive samples of the basebanded analog signal at the baud rate. In a preferred embodiment of the invention, the system is implemented in a purely digital manner and, accordingly, a plural bit digital word defines the amplitude value of each such sample. The technique of the invention, however, is not limited to such digital representations of the analog sample values, as will be appreciated.

The sampled values then are provided to equalizer 22 which, in accordance with the invention, affords cancellation of both lead-in and trailing transients for highly accurate recovery of the transmitted data, despite the presence of severe distortion in the received signals, resulting from the transmission line characteristics. Further considerations of the general requirements of and difficulties in, transmission and reception of such digital data are provided in the noted patents.

Before describing a specific implementation of the present invention, it is instructive to state mathematically various of the conditions and function to be performed. The sampled basebanded signal at any sample time $i$ may be expressed as:

$$X_i = \sum_{k=-\infty}^{\infty} d_{i-k} h_k \qquad (1)$$

where the $d_i$ are transmitted data bits and the $h$'s are impulse response values of the linear model of the communications channel. The $h$'s are assumed to be nearly constant. The convolution sum, as expressed in equation (1), of the signal with the channel characteristics describes the distorted signal, $X_i$, that is received. It is desired to recover the most recently transmitted signal, $d_i$. The presence of signals other than $d_i$, therefore, is intersymbol interference, which is to be eliminated.

First, two simplifying assumptions are made:

a. $h_k \approx 0$ for $k < -M$. This simply means that lead-in transients farther away than M baud times are negligible; and b. $h_k \approx 0$ for $k > N$. This means that the effects of sufficiently stale, i.e., previously received, signals go away if we wait long enough (N samples).

Now equation (1) becomes:

$$X_i - \sum_{k=-M}^{N} d_{i-k} h_k = 0 \qquad (2)$$

If arbitrary guesses are made at the values of the $h$'s and those values are combined as in (2), there results:

$$X_i - \sum_{k=-M}^{N} d_{i-k} \hat{h}_k = \epsilon \qquad (3)$$

where $\hat{h}_k$ is the estimate of the value of $h_k$. In general, of course, (2) is not satisfied and there is some error, $\epsilon$. The difference between (2) and (3) is:

$$\sum_{k=-M}^{N} d_{i-k} \Delta h_k = \epsilon \qquad (4)$$

where an estimation error is defined as $$\Delta h_k = \hat{h}_k - h_k \qquad (5)$$

There is an interesting fact in (4); that $\epsilon$ is a linear combination of the estimation errors. Now $\epsilon$ is to be driven to zero (or to some small value). First we select an even performance criterion, $J(\epsilon) = J(-\epsilon)$. Examples might be $J(\epsilon) = \epsilon^Q$ where Q is any even integer, or $J(\epsilon) = |\epsilon|$.

In any case, we will now try to minimize $J(\epsilon)$, and we will do it by invoking the steep-descent criterion [White, S.A. "Digital Adaptive Element Building Blocks for MOS Large-Scale Integration," *IEEE Trans.*, Vol. C-18, No. 8, pp. 699–706, Aug. 1969]. That is, we find the biggest contributor to the error, and adjust it rapidly. The lesser contributors are adjusted less rapidly. A formal statement of our intentions is $$\dot{\Delta h} = -\nabla J \qquad (6)$$

where $\Delta h$ is a vector whose components are the rate of change of the $\Delta h_k$'s, and where $\nabla J$ is the gradient of J, a vector whose components are $\delta J/\delta\Delta h_k$.

We can then rewrite (6) as:

$$\dot{\Delta h} = \begin{Bmatrix} \dot{\Delta h_0} \\ \dot{\Delta h_1} \\ \cdot \\ \cdot \\ \dot{\Delta h_N} \end{Bmatrix} = -\frac{dJ}{d\epsilon} \begin{Bmatrix} \frac{\partial\epsilon}{\partial\Delta h_0} \\ \frac{\partial\epsilon}{\partial\Delta h_1} \\ \cdot \\ \cdot \\ \frac{\partial\epsilon}{\partial\Delta h_N} \end{Bmatrix} = -f(\epsilon) \begin{Bmatrix} d_i \\ d_{i-1} \\ \cdot \\ \cdot \\ d_{i-N} \end{Bmatrix} \qquad (7)$$

from the chain rule — from (4)

Figure 3:
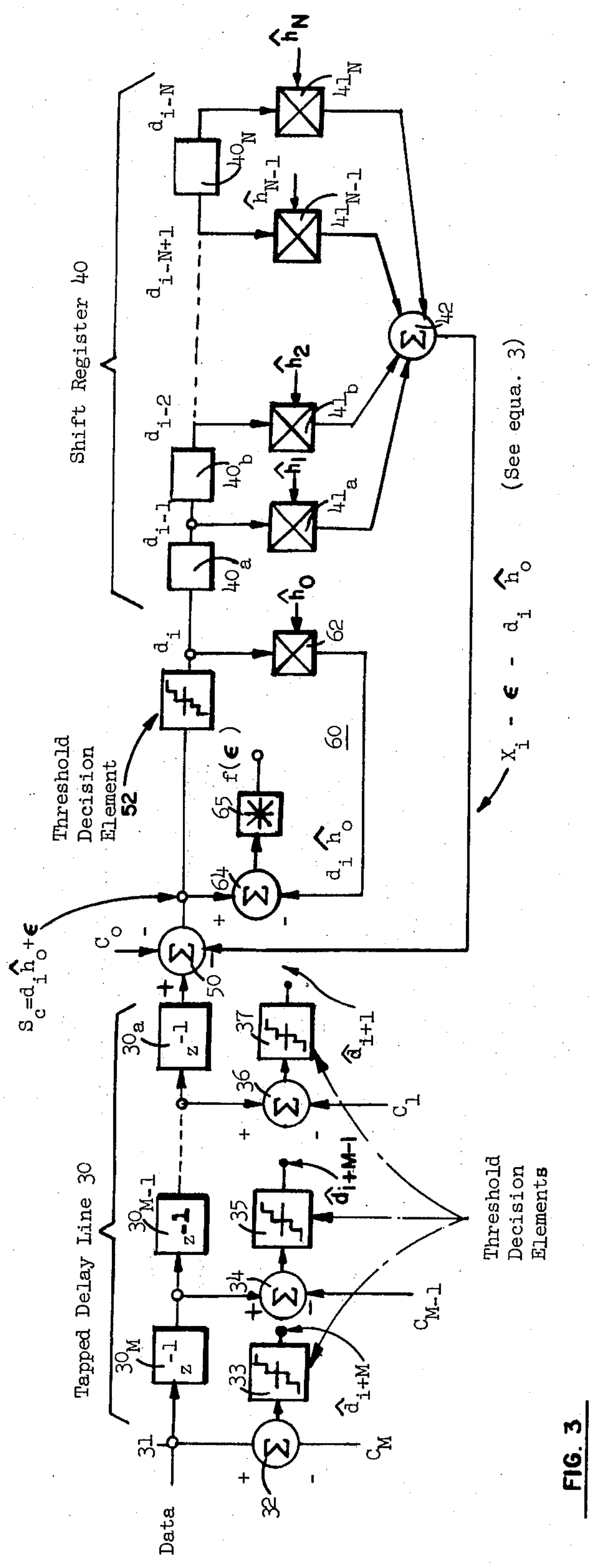
FIG. 3 is a block diagram of a first embodiment of the invention for illustrating the generation of preliminary digit decisions and the correction of lead-in and trailing transients in accordance with features of the invention.

Considering now an implementation of the system in accordance with the invention, in FIG. 3 is illustrated a tapped delay line 30 which, with associated components to be described, generally relates to the function of cancelling lead-in transients and the generation of preliminary data decisions for use in that function, and a shift register 40 which, with associated components, generally is directed to the function of developing a correction signal for cancelling trailing transients. The correction signal $$[X_i - \epsilon - d_i\hat{h}_0]$$

as illustrated in FIG. 3, is subtracted from the sampled signal in summer 50 to provide a corrected signal $$S_c = d_i\hat{h}_0 + \epsilon$$

at the output of summer 50. The term "$\epsilon$" represents residual error remaining in the corrected signal $S_c$, from which the digit $d_i$ at sample time $i$ is to be derived. A threshold decision element 52, which may be considered as a quantitizer, makes a decision as to the value of the digit $d_i$, and produces the digit value $d_i$ at its output, $d_i$ thereby being supplied as the output data bit and also as an input to the shift register 40.

Loop 60 includes a multiplier 62 receiving $d_i$ and the estimated value $\hat{h}_0$ to produce the term $d_i\hat{h}_0$ which is combined in summer 64 with the corrected signal $S_c$ to produce as its output the error term $\epsilon$. Block 65 represents a function generator, supplying as its output a function of the error $f(\epsilon)$. As later described, $f(\epsilon)$ is utilized in deriving the estimated values $\hat{h}_M$ to $\hat{h}_N$.

Considering shift register 40 more closely, the individual stages $40_a$, $40_b$ . . . $40_N$ store preceeding data decisions, as designated at the corresponding outputs of these stages $d_{i-1}, d_{i-2}, \ldots, d_{i-N}$. These prior digit decisions are multiplied in corresponding multipliers, 41$_a$, 41$_b$, . . . 41$_N$ which respectively receive the estimated pulse response terms $\hat{h}_1, \hat{h}_2, \ldots$ and $\hat{h}_N$. Summing of the resultant products in summer 42 produces the error correction signal as shown and above described.

Directing attention again to the delay line 30, the individual delay stages 30$_M$, 30$_{M-1}$, . . . 30$_a$, store successive basebanded data samples and thus are effectively spaced in the baud intervals. In a digital implementation, the stages 30$_M$ . . . 30$_n$ may constitute stages of a shift register, through which the stored data is advanced at the baud rate. The digital samples, where represented as multi-bitwords, e.g. 8 bits, would require a corresponding bit storage capacity for each stage.

The input system, including tapped delay line 30, operates to derive preliminary data decisions which are utilized in computing the channel parameters, or response characteristics, in the following manner. The basebanded data samples supplied at input terminal 31 and thus to the first stage 30$_M$ are supplied also to summer 32. Summer 32 subtracts therefrom a signal represented by the term $C_M$. The output of summer 32 is supplied to threshold decision element 33 which produces as its output the preliminary data decision $\hat{d}_{i+M}$. Adder 34 and decision element 35, and adder 36 and decision element 37, respectively perform similar functions for the input signals thereto, indicated in FIG. 3 and produce the preliminary data decisions $\hat{d}_{i+M}$ . . . and $\hat{d}_{i+M-1}$, as also indicated in FIG. 3. Summer 50 then receives $C_0$ and a feedback tail cancellation signal $X_i - \epsilon - d_i\hat{h}_0$ to produce the final or last successive corrected signal $S_c = d_i\hat{h}_0 + \epsilon$ from which decision element 52 derives the accepted data decision $d_i$.

The functions $C_M \ldots, C_0$ are defined in accordance with:

$$C_j = \sum_{k=j-M}^{N} d_{i+j-k}\hat{h}_k$$

for $k \neq 0$ where $\dot{\hat{h}}_k = -f(\epsilon)\ d_{i-k}$

Figure 4:
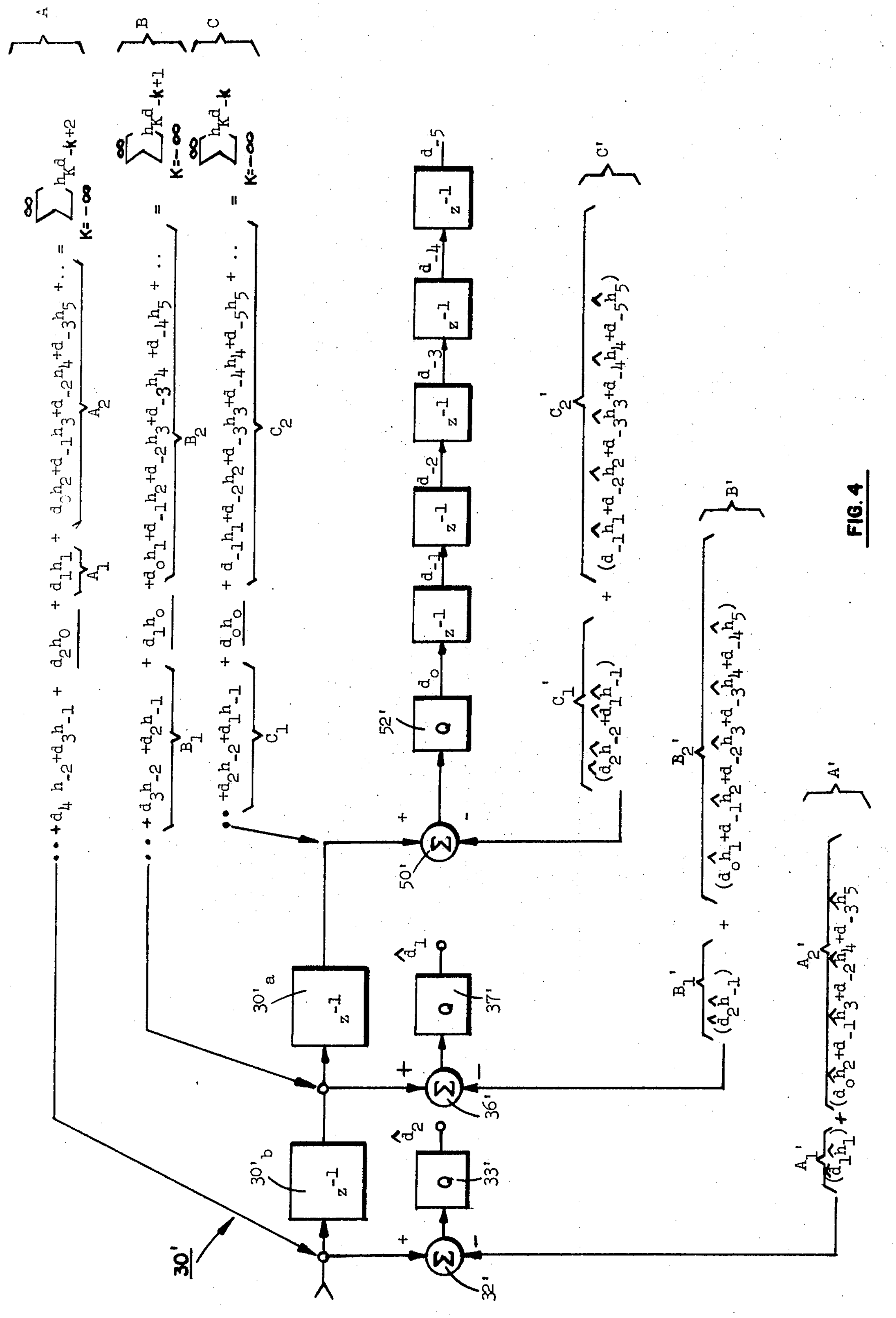
FIG. 4 is a functional block diagram illustrating specific lead-in and trailing transient terms provided to and generated within the system implemented as in FIG. 3.

A better appreciation of the functions performed in the input system 30 of FIG. 3 will be derived from FIG. 4, wherein are shown stages 30'$_a$ and 30'$_b$ corresponding to a two-stage delay line 30 as in FIG. 3 (whereby stage 30'$_b$ may be considered as corresponding to stage 30$_M$ in FIG. 3). Related decision elements and summers are identified by corresponding, primed numerals. Letting $i$=0 for notational convenience, elements 33' and 37' respectively produce the preliminary data decisions $\hat{d}_2$ and $\hat{d}_1$.

In FIG. 4, no correction is made to the sampled basebanded signal supplied through stages 30$_b$ and 30$_a$, until summer 50'. The expressions A, B, and C therefore represent the distorted, sampled signals at the positions indicated, expanded for $k = -$M to $k = +$N. The summers 32', 36' and 50' respectively receive the sampled basebanded signals as expressed by A, B, and C and also the corresponding correction signals A', B' and C', respectively. In expressions A', B', and C' the "ˆ" notations indicate that the values of the associated terms are estimated. Conversely, the corresponding terms in expressions A, B, and C do not include the "ˆ" notations, to signify that these are the actual values of these terms.

The generation of the preliminary decisions now will be apparent. Preliminary decision $\hat{d}_1$ is multipled with the estimated pulse response characteristic $\hat{h}_1$ to produce the cancellation term $A_1'$. Note that $A_1'$ is a tail cancellation term, even though the preliminary digit decision $\hat{d}_1$ is employed therein, since it is to the right (i.e., trails) the term $d_2h_0$ of expression A supplied to summer 32'. The right-hand portion $A_2'$ is the tail cancellation term derived from the output correction signal as produced in FIG. 3 by shift register 40 and associated devices, and particularly from the summer 42. Whereas the $\hat{h}$ notations represent that these terms necessarily are estimated values, the digits $d$ are the digit decisions, assumed to be accurate and thus no "ˆ" notation is shown with the $d$'s. It is then apparent that the threshold decision element, or quantizer, 33', produces a very rough estimate of digit $d_2$, shown therefore as $\hat{d}_2$. Specifically, by subtracting A' from expression A in summer 32', a decision is made as to the value of $d_2$, even though the sampled baseband signal supplied to summer 32' contains non-corrected, lead-in terms.

The data decision $\hat{d}_2$ nevertheless is utilized in developing the nose cancellation term $B_1'$ for subtractive combination in summer 36' with the sampled baseband signal of expression B. Note now that the estimate of digit $d_1$, i.e. $\hat{d}_1$, (from the underlined term in Expression B), is now more accurate since one term, i.e., $d_2h_{-1}$ of the lead-in transient terms $B_1$ is cancelled (approximately) by the estimated nose cancellation term $\hat{d}_2\hat{h}_{-1}$ of signal $B_1'$. There remain, however, further lead-in transient terms in expression B which are not corrected. (Recall that for this example, we have assumed that M=2 and thus that cancellation of only two nose terms is adequate).

Finally, in summer 50', the estimated digits $\hat{d}_1$ and $\hat{d}_2$ are utilized in developing the nose cancellation term $C_1'$ for cancelling the nose terms of the expression $C_1$ of the sampled basebanded signal C. The expression $C_2$ of course is cancelled by the tail correction signal $C_2'$ which, as in expressions $A_2'$ and $B_2'$, is based on the digit decisions. The underlined term $d_0h_0$ from which a decision as to digit $d_0$ is derived, in expression C, now will be appreciated to be far more accurate since error correction for the first two leading transient terms $d_2h_{-2} + d_1h_{-1}$ of expression C, (i.e., part $C_1$) in accordance with $\hat{d}_2\hat{h}_{-2}$ and $\hat{d}_1\hat{h}_{-1}$ (of $C'_1$) has been provided.

It is important to recognize that the preliminary data decisions are not used as data, but rather are used in the computation of the channel pulse response to effect nose cancellation, thereby to enhance the accuracy of the data decisions. It is apparent that as many stages as desired for the nose cancellation signal may be provided, each additional stage providing for correction of a further one of the lead-in transient terms. FIG. 4, as will be appreciated, illustrates the cancellation function for the case M=2 as to lead-in transients. Similarly, FIG. 4 illustrates the case for N=5 as to cancellation of trailing transients.

Figure 5:
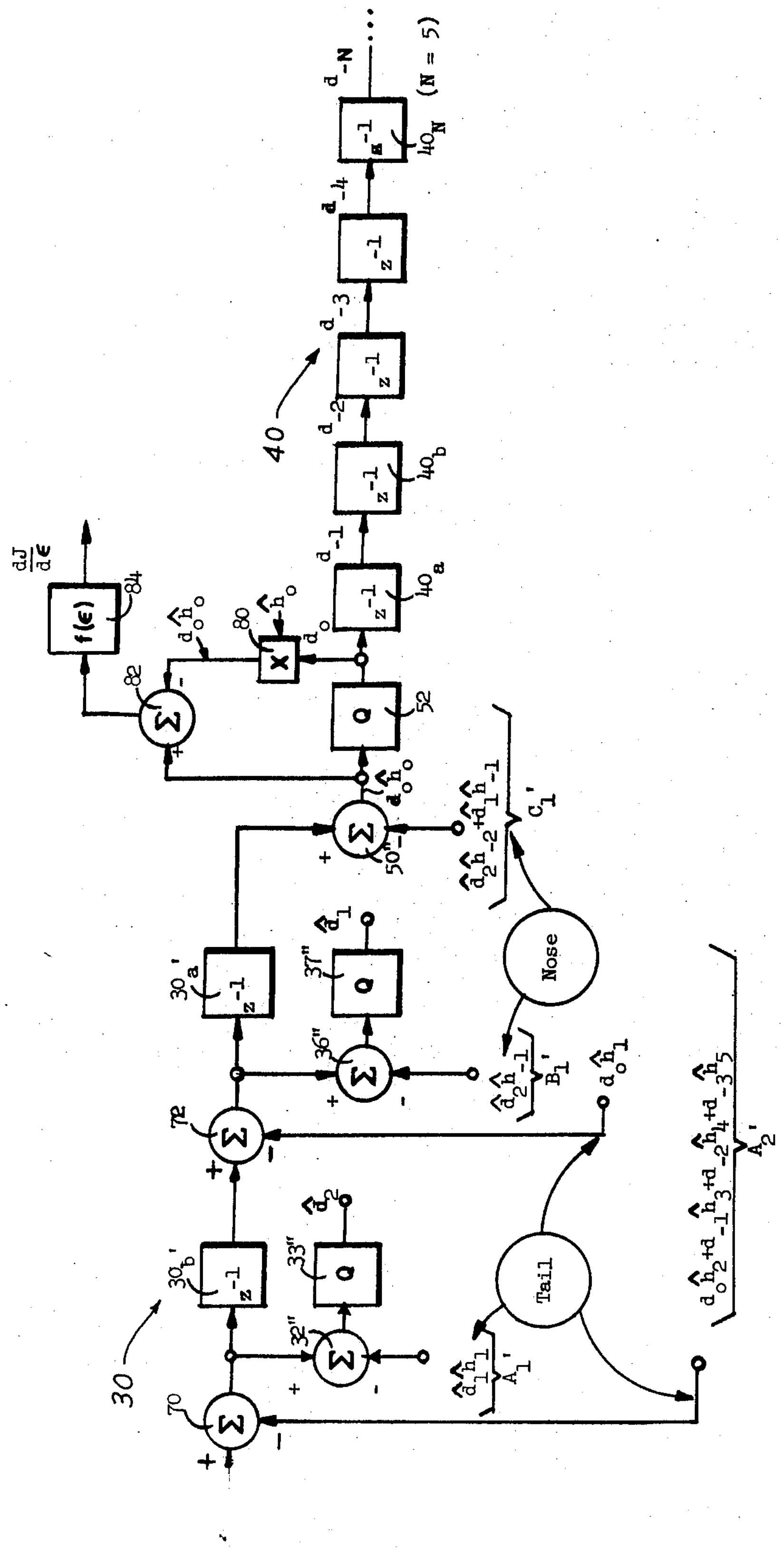
FIG. 5 is a block diagram of an alternative implementation of a system in accordance with the invention.

FIG. 5 illustrates an implementation of the system of the invention performing the identical functions as in the implementation of FIG. 4 but wherein the cancellation of trailing transients is provided in summer 70, prior to initiation of the cancellation of leading transients. The tail cancellation terms of expression $A_2'$, identical to that of FIG. 4, is subtracted directly from the basebanded sampled signal by summer 70. Summer 32'' then receives only the further tail cancellation term $A_1'$ and the corrected basebanded signal from summer 70 to derive, through quantizer 33'', the estimated digit decision $\hat{d}_2$. Summer 72, receiving the output of stage 30'$_b$ affords the further correction to the sampled baseband signal of subtracting $d_0 \hat{h}_1$ (the first term of the tail cancellation terms of expression $B_2'$ in FIG. 4) to provide a further corrected signal to stage 30$_a'$ and summer 36''. Summer 36'' then receives the nose correction signal $\hat{d}_2 \hat{h}_{-1}$ (corresponding to expression $B_1'$ in FIG. 4) to provide a further corrected signal to quantizer 37'' for generating the preliminary data decision $\hat{d}_1$. Finally, summer 50'' receives the sampled baseband signal from stage 30$_a'$ from which the nose correction signal corresponding to expression $C_1'$ is subtracted to yield the output term $d_o\hat{h}_o$ from which the data decision $d_o$ is made. The portion of the system affording tail cancellation as shown in FIG. 5 may be identical to that of FIG. 3 and correspondingly, the elements are identified by corresponding numerals.

FIG. 5 also illustrates the determination of the $\epsilon$ signal; the digit decision $d_0$ is multiplied with the estimated pulse response term $\hat{h}_0$ by multiplier 80 and the resulting product $d_0 \hat{h}_0$ subtracted in summer 82 from the signal actually output by summer 50'', to produce the error output $\epsilon$ which is supplied in turn to a function generator 84. As described in more detail hereafter, generator 84 may perform the function $dJ/d\epsilon$.

In FIG. 3, block 65, bearing the notation*, corresponds to the block 84 in FIG. 5, each thereof serving the identical function of relating $\epsilon$ to $f(\epsilon)$ and, from equation 7 above, determines J, since $J= \int f(\epsilon)\, d\epsilon$. Any suitable performance criteria may be selected in determining the function of blocks 65 and 84, for example, where that performance criterion is unity gain, $J = ½\epsilon^2$. Mechanization of that function can be a simple conductor. As later explained, a preferred criterion is $f(\epsilon) = \text{Sgn}\ \epsilon$, or $J=|\epsilon|$. This affords the advantage of eliminating an additional multiplier per parameter $h$, the elimination of the digital multipliers affording a cost advantage and overall simplification of implementation.

The foregoing discussion has assumed the availability of the estimated values of $h$, i.e., the various $\hat{h}_k$. The generation of the values in light of equation 7 above, may be represented as in FIG. 6.

Figure 6:
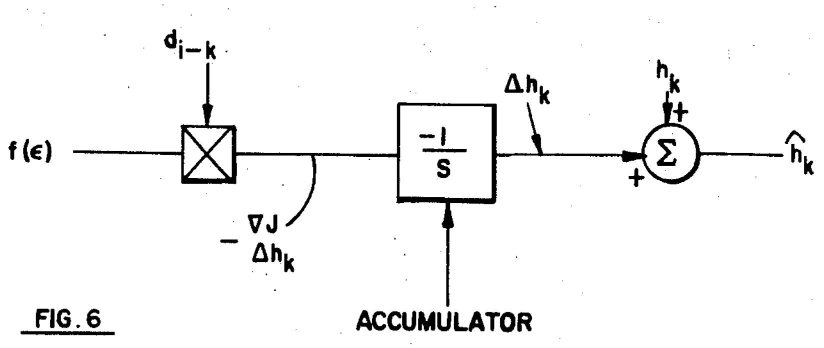
FIG. 6 is a generalized block diagram representing the generation of the estimated pulse response terms of the transmission channel.
Figure 7:
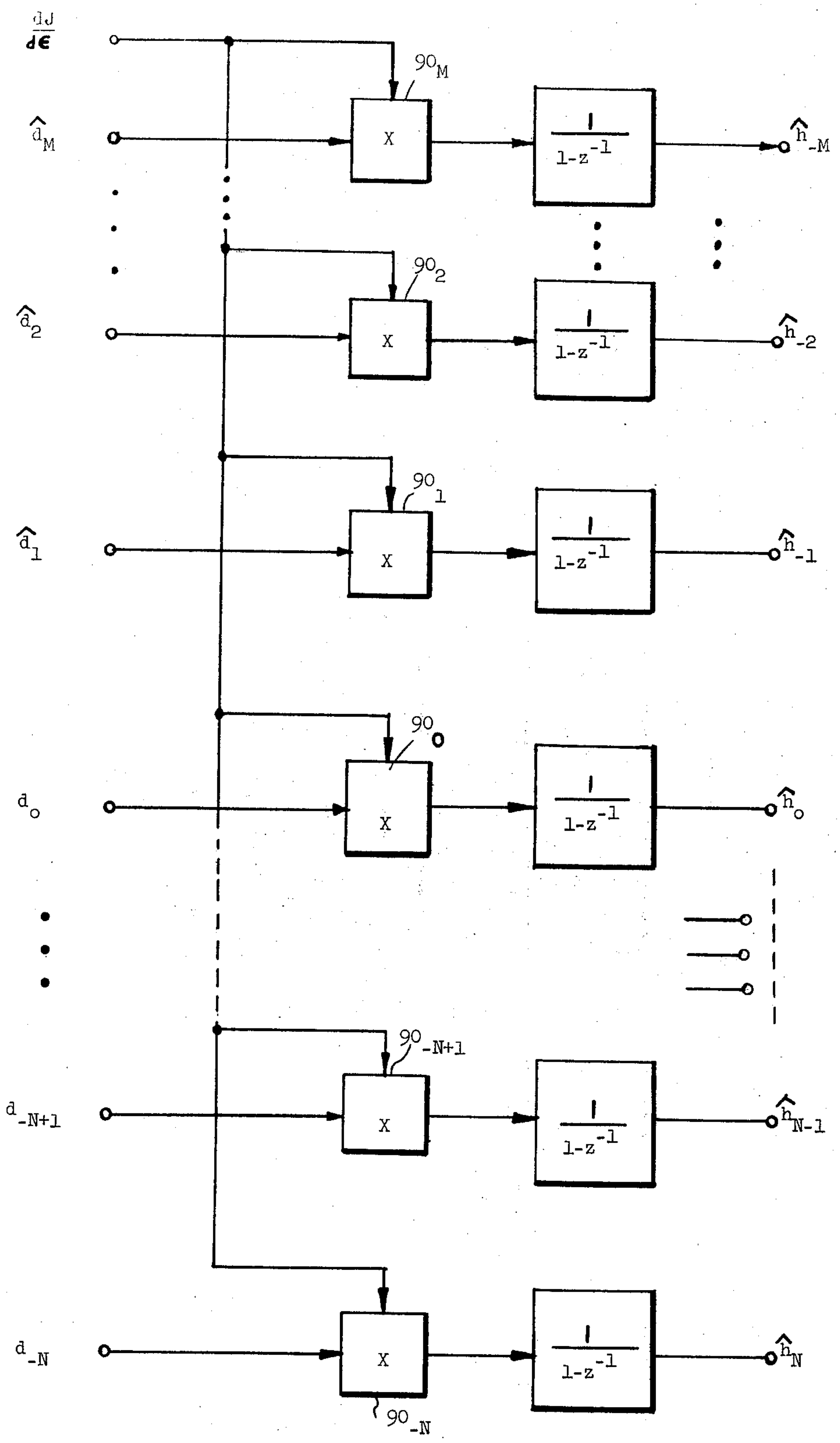
FIG. 7 is a more detailed block diagram illustrating the generation of the specific pulse response terms of the transmission channel.

The extension of FIG. 6 to cover the case for all of the estimates of the channel response values is shown in FIG. 7. From equations 3 through 5, the error function can be expressed as:

$$\epsilon = \sum_{k=-\infty}^{\infty} \hat{h}_k d_{-k} - \sum_{k=-\infty}^{\infty} h_k d_{-k}$$

$$= \sum_{k=-\infty}^{\infty} \Delta h_k d_{-k} \simeq \sum_{k=-M}^{N} \Delta h_k d_{-k} \qquad (8)$$

In equation 8, a suitable "guess" may be made for the values of M and N and, consistent with the illustrations of FIGS. 4 and 5, the values may be M=2 and N=5. These values have been demonstrated to be sufficient to afford significant and adequate reduction of lead-in and trailing transients and thus of the intersymbol inference.

From equations 6 and 7, we may also write:

$$\dot{\underset{\sim}{\Delta h}} = -\nabla J = -(dJ/d\epsilon)\ d\epsilon/d\underset{\sim}{\Delta h} = -\epsilon \underset{\sim}{d} \qquad (9)$$

consistent with our intention of minimizing the performance criterion J ($\epsilon$).

An implementation of the result of equation 9 for generation of the estimated $h$ values in accordance with equation 8 then is shown in FIG. 7. The error function $dJ/d\epsilon$ is supplied as an input in common to multipliers 90$_M$ . . . 90$_2$, 90$_1$ . . . 90 $_{-N}$, the latter receiving the similarly designated digits $\hat{d}_M$ . . . $\hat{d}_2$, $\hat{d}_1$ . . . $d_{-N}$. From the foregoing discussion, it will be appreciated that the digits $d_k$ for $k = 1, 2, \ldots$ M, are the preliminary digit decisions and hence are rough approximations, as indicated by the "^" signs. By contrast, the digits $d_k$ for $k = 0, -1, -2, \ldots -N$ are the digit decisions derived from the stages of the shift register. The outputs of the multipliers 90$_M$ through 90$_{-N}$ are supplied to corresponding integrators from which the estimated pulse response values $\hat{h}_k$ are derived.

Figure 8:
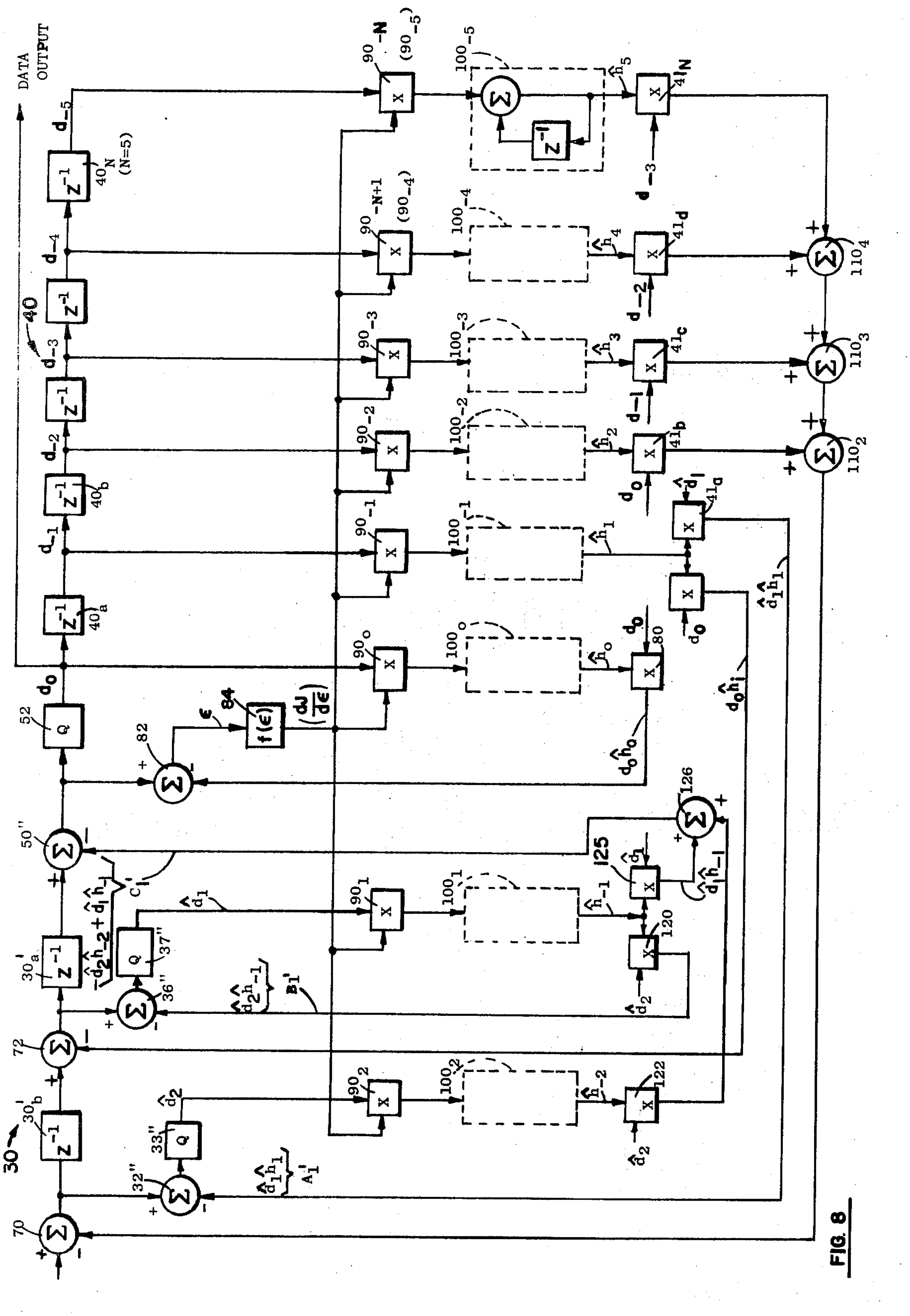
FIG. 8 is a detailed block diagram of the system of the invention in accordance with the implementation of FIG. 5.

In FIG. 8 is shown a block diagram of a system in accordance with the invention providing both the lead-in (or nose), and trailing (or tail) transient cancellation. In view of the simplification of implementation afforded by the particular circuit of FIG. 5, FIG. 8 is structured on the basis of FIG. 5. Structuring of a similar circuit on the basis of FIG. 1 will be apparent.

To simply the description of FIG. 8 and to relate it to the foregoing figures, identical numerals are used for identifying identical elements. Since the shift register 40 is identical in each case, it is again shown to include stages 40$_a$, 40$_b$ . . . 40$_N$ and particularly for N=5. The input delay line 30 as in FIGS. 3 and 5 is shown to include the stages 30$_a'$ and 30$_b'$, in accordance with M=2. As before noted, for a multi-bit, e.g. 8 bit, digital word defining the baseband samples, the stages 30$_a'$ and 30$_b'$ are 8 bit shift register stages. Conversely, the stages 40$_a$, 40$_b$ . . . of shift register 40 may be two bit stages. Expansion of the system to multi-level signaling is discussed hereinafter.

The multipliers 41$_a$ . . . 41$_N$ of FIG. 3 are indicated in FIG. 8. The values $\hat{h}_0$ through $\hat{h}_5$ (since N=5) supplied to those multipliers are derived from integrators 100$_0$, 100$_{-1}$, 100$_{-2}$ . . . , 100$_{-5}$, (since N=5). The integrators 100$_0$ through 100$_{-5}$ and the associated multipliers 90$_0$ through 90$_{-5}$ correspond to the integrators and associated multipliers for the terms $d_0$ to $d_{-N}$ in FIG. 7. Likewise, the multipliers 90$_1$ and 90$_2$ (since M=2) and associated integrators 100$_1$ and 100$_2$ correspond to the similarly designated multipliers and corresponding integrators of FIG. 7.

FIG. 8 illustrates summers 110$_2$, 110$_3$ and 110$_4$ which combine the outputs of their associated circuits to produce the tail cancellation term $A_2'$ as in FIG. 5. The further tail cancellation term $A_1'$ is derived from multiplier 41*a*. The remaining cancellation terms are similarly identified by labeling as in FIG. 5. For example, multiplier 120 provides the $B_1'$ cancellation term and multipliers 122 and 125, the output products of which are summed in summer 126, provide the $C_1'$ cancellation term to 50'' as in FIG. 5.

It will be appreciated that the present correction system is capable of operation in conjunction with multilevel modulation systems. When so used, it is possible to obtain the impulse response of the transmission channel and to perform the preliminary digit decisions utilizing the most significant bits only. Appropriate correction signals for each of the nose and tail cancellation may be obtained by digitally multiplying the impulse responses first by the most significant bits and then by the bits of lesser significance, and summing the products. This enables weighing the more significant bits more heavily in the summation. It will also be apparent that the system may be readily extended to correct for cross channel coupling — in general, the modifications necessary merely are those required for identifying twice as many $d$'s.

As above noted, a significant simplification and cost savings is realized by making the $J(\epsilon) = |\epsilon|$ so that $dF/d\epsilon = \text{sgn}\ \epsilon$. This computation requires simply placing either $+d_{i-k}$ or $-d_{i-k}$ into the accumulator. Thus, the multipliers $90_2$ through $90_{-5}$ of FIG. 8 may be eliminated and merely a sign control circuit substituted therefor.

Although the invention has been described in detail, it is to be understood that the same is by way of illustration and example only, and is not to be taken by way of limitation, the spirit and scope of this invention being limited only by the terms of the appended claims.

What is claimed is:

1. A method for recovering digital data transmitted over a transmission channel and utilizing adaptively equalized feedback for cancellation of trailing transients and providing for cancellation of lead-in transients, and comprising:

sampling a received, basebanded signal at the baud rate of transmission to produce a succession of amplitude representative samples, storing successive samples for a predetermined number of baud intervals in succession, in an input storage system, deriving a predetermined number of adaptively equalized feedback trailing transient correction terms in multiplying and summing circuits, cancelling from each sample presented for storage, the trailing transient terms in accordance with the feedback correction terms to produce a first corrected sample, generating a preliminary data decision from the first corrected sample, producing a first transient correction term for the preliminary data decision in accordance with the product of that decision and its corresponding pulse response characteristic term, cancelling from each successively stored sample, in addition to the predetermined number of trailing transient terms, a lead-in transient term defined by the sum of the first transient correction term and the product of each of preceding preliminary data decisions and its corresponding pulse response term for cancellation of a first and successive lead-in transient terms from the successively stored samples, to successively produce last corrected samples, performing data decisions in a derivation circuit on each of the last corrected samples to produce an output data decision from that last corrected sample and accepting the output data decisions as the data, storing successive ones of said output data decisions in accordance with the predetermined number of trailing transient terms, generating the corresponding pulse response characteristic terms of the transmission channel by respectively integrating associated said stored successive data decisions, and multiplying said, integrated successive output data decisions with the respectively corresponding pulse response characteristic terms of the transmission channel and summing the resulting products to produce said predetermined number of trailing transient correction terms.

2. A method as recited in claim 1 furthermore comprising:

multiplying each successive output data decision with its corresponding pulse response term and cancelling the resultant product from said last corrected sample to derive an error term, and adjusting the values of the pulse response terms as a function of the error term.

3. A method recited in claim 2 wherein the function of the error term is the sign thereof.

4. A method as recited in claim 1 wherein said predetermined number of trailing transient correction terms are cancelled from the signal sample to be presented for storage in said input system, and wherein successive trailing transient correction terms are derived from the product of each successive data decision and its corresponding pulse response terms and each thereof is cancelled from each of the amplitude representative samples to provide the first corrected sample for successive storage.

5. A method as recited in claim 4 wherein the successively produced lead-in transient correction terms are cancelled from the last of the successively stored samples to develop the last corrected sample from which said last data decision is derived.

6. A system for recovering digital data transmitted over a transmission channel and utilizing adaptively equalized feedback for cancellation of trailing transients and providing for cancellation of lead-in transients, and comprising:

means for sampling a received, basebanded signal at the baud rate of transmission to produce a succession of amplitude representative samples, an input storage system for storing successive samples for a predetermined number of baud intervals in succession, means for sequentially deriving output data decisions from last corrected samples, a feedback system including a predetermined number of storage stages for storing successive output data decisions, said feedback system including means coupled to said storage stages for developing the corresponding pulse response characteristic terms of the transmission channel in response to the associated storage successive output data decisions, means for multiplying said stored, successive output data decisions with the respectively corresponding pulse response characteristic terms of the transmission channel and summing the resulting products to produce a corresponding, predetermined number of trailing transient correction terms, first means coupled to said sampling means and to said input storage system for cancelling from each sample presented for storage the trailing transient correction terms from said feedback system to produce a first corrected sample, means coupled to said first means for generating a preliminary data decision from the first corrected sample, means for producing lead-in transient correction terms in accordance with the product of each preliminary data decision and a corresponding pulse response term, and second means, coupled to said input storage system and to said producing means, for cancelling from each of the successively stored samples of said input storage system, in addition to the predetermined number of trailing transient terms, the lead-in transient correction terms produced by said producing means to successively produce the last corrected samples.

7. A system recited in claim 6 furthermore comprising:

means coupled to said deriving means for multiplying each output data decision therefrom by its corresponding pulse response term and cancelling the resultant product from said last corrected sample to derive an error term, and means for adjusting the values of the pulse response terms as a function of the error term.

8. A system as recited in claim 7 wherein said adjusting means includes means responsive to the sign of the error term for adjusting the values of the pulse response terms as a function of the sign of the error term.

9. A system as recited in claim 6 wherein:

said input storage system comprises M stages for storing M signal samples, and said feedback system includes N storage stages.

10. A system as recited in claim 9 wherein:

said input storage system comprises an M stage shift register, and said N storage stages of said feedback system comprise stages of a shift register.

11. A system as recited in claim 9 wherein there are provided:

M summing means for M=1, 2, . . . respectively receiving the sample made input to each successive stage of said M stage shift register, and receiving in subtractive relationship the trailing transient correction terms, each of the summing means having associated therewith a quantizer for deriving therefrom a preliminary digit decision.

at least one of said M summing means furthermore receiving in subtractive relationship an associated lead-in transient correction term defined by the product of an associated preceding preliminary digit decision and a corresponding pulse response term, and a final summing means and associated quantizer, said final summing means receiving the last stored sample from the last storage stage and, in subtractive relationship, trailing and lead-in transient correction terms to provide the last corrected sample from which said associated quantizer derives a data decision accepted as the data.

12. A system as recited in claim 9 wherein there is provided:

a first summer receiving each successive sample and the corresponding trailing transient correction terms to provide the first corrected sample to the $M^{th}$ storage stage, M summers and associated quantizers receiving the inputs to the corresponding M storage stages and producing corresponding preliminary data decisions, the $M^{th}$ summer receiving a trailing transient correction term defined by the preliminary data decision of the $M-1^{th}$ summer and quantizer and a corresponding pulse response term, each successive one of the M−1 summers receiving a lead-in transient correction term in accordance with the preliminary data decision of each preceding summer and quantizer, a summer preceding each successive one of the M stages for receiving the corrected sample of the preceding stage and a next successive trailing correction term to provide a further corrected sample to the succeeding stage, and a final summer and quantizer receiving the output of the last stage and lead-in cancellation terms defined by the sum of the products of each preliminary decision and a corresponding impulse response term to provide the last corrected sample from which the quantizer derives a data decision accepted as the data.

13. A system for cancelling both trailing and lead-in transients in received basebanded signals to recover digital data transmitted over a transmission channel, said system comprising:

first means for sampling the received, basebanded signal at the baud rate of transmission to produce a succession of amplitude representative samples;

first storage means for storing successive samples for a predetermined number of baud intervals in succession;

second means coupled to said first storage means, being selectively responsive to successive samples and to a plurality of first cancellation terms, for deriving at least one preliminary data decision;

third means, coupled to said first storage means, being responsive to each of the samples therefrom and to a plurality of second and third cancellation terms for developing a final corrected signal in which trailing and lead-in transients are cancelled;

fourth means responsive to the final corrected signals for developing a plurality of successive data output decisions;

fifth means coupled to said fourth means for storing the plurality of data output decisions;

sixth means coupled to said third and fourth means for developing an error function;

seventh means coupled to said fifth means, being selectively responsive to the stored plurality of data output decisions and a plurality of estimated pulse response values for developing the plurality of second cancellation terms;

eighth means responsive to the error function, preliminary data decisions and to the plurality of stored data output decisions for developing the plurality of estimated pulse response values; and ninth means, coupled to said first storage means and to said third and eighth means, being responsive to preliminary data decisions and selected ones of the plurality of estimated pulse response values for developing the first and third cancellation terms.

14. A system for cancelling both trailing and lead-in transients in received basebanded signals to recover digital data transmitted over a transmission channel, said system comprising:

means for sampling a received, basebanded signal at the baud rate of transmission to produce a succession of amplitude representative samples;

means for storing successive samples for a predetermined number of baud intervals in succession;

first means for sequentially deriving output data decisions from corrected samples applied thereto;

a first combiner, coupled between said storing means and said first means, being responsive to a first plurality of preselected cancellation terms and samples from said storing means for developing the corrected samples in which lead-in and trailing transients are cancelled;

second means responsive to a second plurality of preselected cancellation terms and to samples applied to said storing means for deriving at least one preliminary data decision;

third means for storing the plurality of output data decisions;

fourth means coupled to said first combiner and to said first means for developing an error function;

fifth means responsive to preliminary data decisions, the error function and to the stored output data decisions for developing a plurality of estimated pulse response values;

a first feedback loop for selectively deriving the first plurality of preselected cancellation terms from preliminary data decisions, estimated pulse response values and the plurality of stored output data decisions, said first feedback loop applying the first plurality of preselected cancellation terms to said first combiner; and a second feedback loop for selectively deriving the second plurality of preselected cancellation terms from preliminary data decisions, estimated pulse response values and the plurality of output data decisions, said second feedback loop applying the second plurality of preselected cancellation terms to said second means.

15. The system of claim 14 further including:

a second combiner coupled between said sampling means and said storing means, said second combiner being responsive to the succession of amplitude representative samples and to a third plurality of preselected cancellation terms for cancelling the trailing transients from the samples applied to said storing means; and a third feedback loop for selectively deriving the third plurality of preselected cancellation terms from preliminary data decisions, estimated pulse response values, and the plurality of output data decisions, said third feedback loop applying the third plurality of preselected cancellation terms to said second combiner.

* * * * *